(12) United States Patent
Suzuki (10) Patent No.: US 8,959,373 B2
(45) Date of Patent: Feb. 17, 2015

(54) COMMUNICATION DEVICE FOR EXECUTING PACKET PROCESS IN LOW CONSUMPTION STATE

(75) Inventor: Takanobu Suzuki, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 407 days.

(21) Appl. No.: 13/362,752

(22) Filed: Jan. 31, 2012

(65) Prior Publication Data

US 2012/0198259 A1    Aug. 2, 2012

(30) Foreign Application Priority Data

Jan. 31, 2011    (JP) ................................. 2011-019047

(51) Int. Cl.
*G06F 1/32*    (2006.01)
*G06F 3/12*    (2006.01)

(52) U.S. Cl.
CPC ............ *G06F 3/1221* (2013.01); *G06F 1/3284* (2013.01); *G06F 3/1229* (2013.01); *G06F 3/1279* (2013.01); *Y02B 60/1267* (2013.01); *Y02B 60/1271* (2013.01)
USPC ............................ 713/324; 713/320; 713/323

(58) Field of Classification Search
CPC ... G06F 1/3206; G06F 1/3209; G06F 1/3234; G06F 1/323; G06F 1/3215; G06F 1/3293; G06F 1/3284; Y02B 60/00; Y02B 60/10; Y02B 60/12; Y02B 60/34; H04W 52/322; H04W 52/325; H04W 52/327
See application file for complete search history.

(56) References Cited

U.S. PATENT DOCUMENTS

| | | | |
|---|---|---|---|
| 6,408,395 B1 | 6/2002 | Sugahara et al. | |
| 6,694,360 B1* | 2/2004 | Duguay et al. | 709/220 |
| 2002/0178389 A1 | 11/2002 | Satoh | |
| 2005/0240788 A1 | 10/2005 | Satoh | |
| 2006/0218440 A1 | 9/2006 | Inoue | |
| 2009/0282278 A1* | 11/2009 | Satoh | 713/321 |
| 2010/0268973 A1* | 10/2010 | Park | 713/323 |
| 2011/0078464 A1* | 3/2011 | Yokomizo | 713/300 |
| 2011/0213992 A1* | 9/2011 | Satsangi et al. | 713/300 |

FOREIGN PATENT DOCUMENTS

| | | | |
|---|---|---|---|
| JP | H11-231977 A | | 8/1999 |
| JP | 2002-292973 A | | 10/2002 |

(Continued)

OTHER PUBLICATIONS

Japanese Office Action issued in JP 2011-019047, mailed Jan. 21, 2014.

*Primary Examiner* — Dennis M Butler
(74) *Attorney, Agent, or Firm* — Merchant & Gould PC (57) ABSTRACT

In a case where a first condition is met while a communication device may in a high consumption state, the communication device may transit to a first low consumption state. In a case where a second condition is met while the communication device is in a specific state which is one state of the high consumption state and the first low consumption state, the communication device may transit to a second low consumption state. The communication device may be configured to execute a packet process in a case where a receiving process for receiving a packet is executed after the communication device had transited to the first low consumption state. The communication device may be configured not to execute the packet process in a case where the receiving process for receiving the packet is executed after the communication device had transited to the second low consumption state.

7 Claims, 7 Drawing Sheets

(56) References Cited

FOREIGN PATENT DOCUMENTS

| JP | 2002-300329 A | 10/2002 |
| JP | 2006-270538 A | 10/2006 |
| JP | 2006-309731 A | 11/2006 |
| JP | 2009-151009 A | 7/2009 |

* cited by examiner

| | | Main CPU 20 | Sub CPU 30 | SRAM 60 | SDRAM 90 | Display Panel 98 |
|---|---|---|---|---|---|---|
| 302 | Processing State | Clock Supplied | Clock Supplied | Normal Behavior Mode | Normal Behavior Mode | ON |
| 304 | Standby State | Clock Supplied | Clock Supplied | Normal Behavior Mode | Normal Behavior Mode | ON |
| 306 | L-Sleeping State | Clock Supplied | Clock Supplied | Normal Behavior Mode | Normal Behavior Mode | OFF |
| 308 | FD-Sleeping State and SD-Sleeping State | Clock Stopped | Clock Supplied | Normal Behavior Mode | Self Refresh Mode | OFF |

COMMUNICATION DEVICE FOR EXECUTING PACKET PROCESS IN LOW CONSUMPTION STATE

CROSS-REFERENCE TO RELATED APPLICATIONS

This application claims priority to Japanese Patent Application No. 2011-019047, filed on Jan. 31, 2011, the contents of which are hereby incorporated by reference into the present application.

TECHNICAL FIELD

The present application discloses a communication device to be connected with a network.

DESCRIPTION OF RELATED ART

A multi-function device is known that transits between modes, e.g., a normal operation mode and three modes having a lower power consumption than the normal operation mode (i.e., standby mode, energy saving mode, and power off mode). When one of the three low power consumption modes is selected by a user, this multi-function device transits to the selected mode. When a recovery time instructed by the user is reached, the multi-function device transits to the normal operation mode.

SUMMARY

In the aforementioned art, the situation is not taken into consideration where a packet is received by the multi-function device while the power consumption of the multi-function device is in a low state. In the present specification, an art is taught that allows the power consumption of the multi-function device to be reduced further while taking into consideration the situation where a packet is received while the power consumption of the multi-function device is in the low state.

An art disclosed in the present application is a communication device to be connected with a network. The communication device may comprise a processing unit and a memory. The processing unit may be configured to execute a receiving process for receiving a packet via the network and a packet process in accordance with the packet received by the receiving process. The memory may be used when the process unit executes a process. The communication device may be capable of transiting between a high consumption state in which a power consumption of at least one of the processing unit and the memory is relatively high and a low consumption state in which the power consumption of at least one of the processing unit and the memory is relatively low. The low consumption state may include a first low consumption state and a second low consumption state. In a case where a first condition is met while the communication device is in the high consumption state, the processing unit may be configured to further execute a first transiting process for causing the communication device to transit from the high consumption state to the first low consumption state. In a case where a second condition different from the first condition is met while the communication device is in a specific state which is one state of the high consumption state and the first low consumption state, the processing unit may be configured to further execute a second transiting process for causing the communication device to transit from the specific state to the second low consumption state. The processing unit may be configured to execute the packet process in accordance with a first packet in a case where the receiving process for receiving the first packet is executed after the communication device had transited to the first low consumption state by the first transiting process. The processing unit may be configured not to execute the packet process in accordance with the first packet in a case where the receiving process for receiving the first packet is executed after the communication device had transited to the second low consumption state by the second transiting process.

Moreover, a control method and a computer program for realizing the communication device described above, and a computer readable recording device in which the computer program is stored are also novel and useful. Further, a system that includes the communication device and the specific device described above is also novel and useful.

EMBODIMENT

Figure 1:
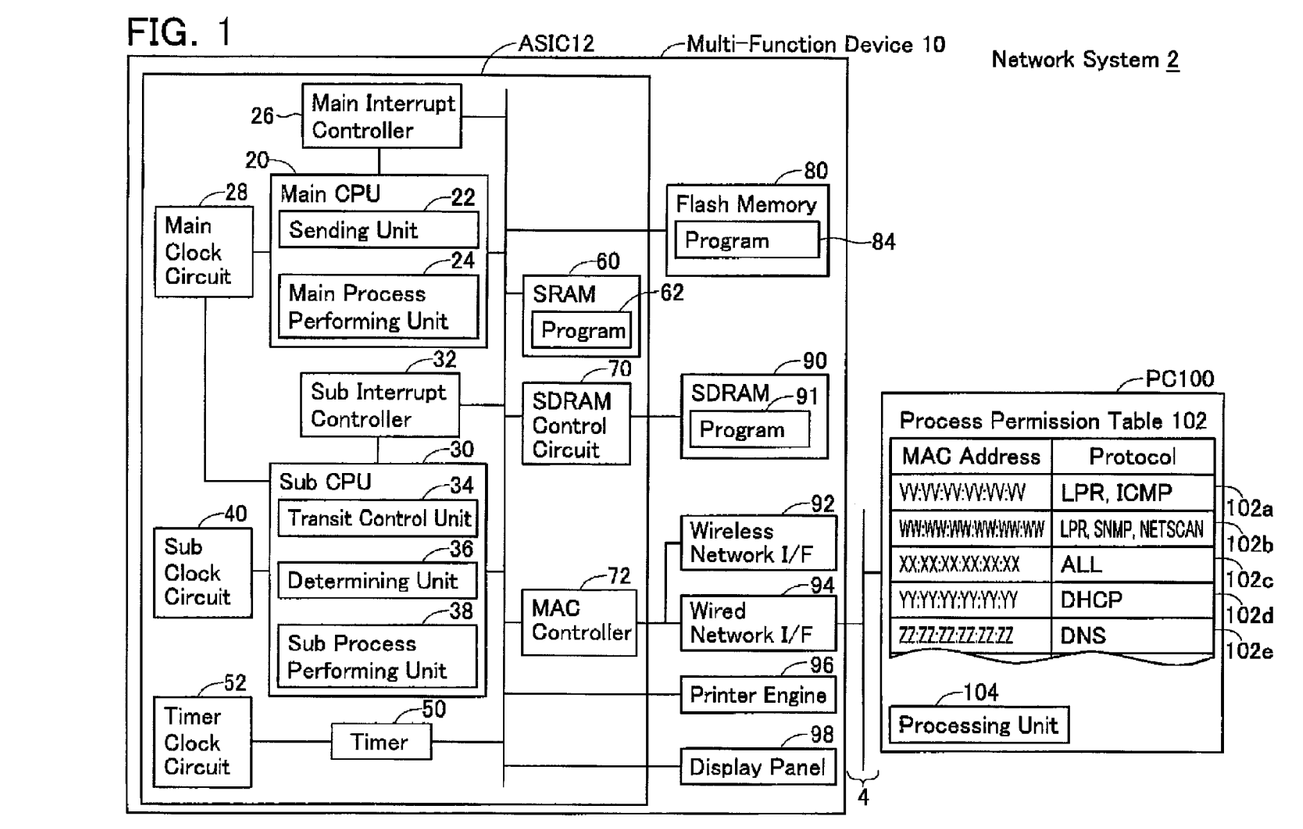
FIG. 1 shows the configuration of a network system.

As shown in FIG. 1, a network system 2 comprises a PC 100 and a multi-function device 10 (i.e., a peripheral device of the PC 100). The PC 100 and the multi-function device 10 can communicate with one another via a LAN 4.

(Configuration of Multi-Function Device 10)

As shown in FIG. 1, a multi-function device 10 comprises an ASIC (Application Specific Integrated Circuit) 12, a flash memory 80, an SDRAM 90, network interfaces 92, 94, a printer engine 96 and a display panel 98.

(Configuration of ASIC 12)

The ASIC 12 comprises a main CPU 20, a main interrupt controller 26, a main clock circuit 28, a sub CPU 30, a sub interrupt controller 32, a sub clock circuit 40, a timer 50, a timer clock circuit 52, an SRAM 60, an SDRAM control circuit 70 and a MAC controller 72.

(Configuration of Main CPU 20)

The main CPU 20 executes various processes according to a program 91 stored in the SDRAM 90. Thereby, the functions of a sending unit 22 and a main process performing unit 24 are realized. While a clock signal is being supplied from the main clock circuit 28 to the main CPU 20, the main CPU 20 is in a non-sleeping state. While the clock signal is not being supplied to the main CPU 20, the main CPU 20 is in a sleeping state. The sleeping state of the main CPU 20 is a state in which a power consumption is lower than in the non-sleeping state of the main CPU 20. The main clock circuit 28 is controlled by the sub CPU 30.

The main interrupt controller 26 supplies an interruption request signal acquired from the exterior of the main CPU 20 (e.g., from the sub CPU 30, the timer 50, the MAC controller 72) to the main CPU 20. Upon acquiring the interruption request signal from the main interrupt controller 26, the main CPU 20 executes a process according to the interruption request signal.

(Configuration of Sub CPU 30)

The sub CPU 30 executes various processes according to a program 62 stored in the SRAM 60. Thereby, the functions of a transit control unit 34, a determining unit 36 and a sub process performing unit 38 are realized. The sub clock circuit 40 supplies a clock signal to the sub CPU 30. The frequency of the clock signal of the sub clock circuit 40 is lower than the frequency of the clock signal of the main clock circuit 28. Consequently, the power consumption for driving the sub CPU 30 is lower than the power consumption for driving the main CPU 20. Further, the processing speed of the main CPU 20 is faster than the processing speed of the sub CPU 30. The sub clock circuit 40 supplies the clock signal to the sub CPU 30 when a power supply of the multi-function device 10 is turned ON, and halts the clock signal when the power supply of the multi-function device 10 is turned OFF. That is, while the power supply of the multi-function device 10 is ON, the sub CPU 30 is maintained in a state where the clock signal is being supplied (the non-sleeping state).

The sub interrupt controller 32 supplies, to the sub CPU 30, the interruption request signal acquired from the exterior of the sub CPU 30 (e.g., from the main CPU 20, the MAC controller 72). Upon acquiring the interruption request signal from the sub interrupt controller 32, the sub CPU 30 executes a process according to the interruption request signal.

(Configuration of Other Elements)

The timer 50 is synchronized with the clock signal supplied from the timer clock circuit 52, and executes a countdown from a preset initial value.

The SRAM 60 can be accessed from the CPUs 20 and 30. While the main CPU 20 is in the sleeping state, the sub CPU 30 stores, in the SRAM 60, a packet received via the LAN 4. The SRAM 60 further stores the program 62 for the sub CPU 30 to realize the functions of the units 34, 36, 38. The program 62 is stored in a compressed state in the flash memory 80. When the power supply of the multi-function device 10 is turned ON, the main CPU 20 expands a compressed program 84 in the flash memory 80, and stores the expanded program 62 in the SRAM 60. The SRAM 60 stores one value out of a plurality of state variables corresponding to a plurality of states (to be described: see the five states 302 to 308b of FIG. 2). One of the CPUs 20, 30 changes the state variable stored in the SRAM 60.

The SDRAM control circuit 70 accesses the SDRAM 90 according to an instruction from the CPUs 20, 30. Further, the SDRAM control circuit 70 starts or halts the supply of the clock signal to the SDRAM 90 according to an instruction from the sub CPU 30 so as to cause the state of the SDRAM 90 to transit between a normal behavior mode, in which the power consumption is relatively high, and a self refresh mode, in which the power consumption is relatively low.

The MAC controller 72 is connected with the network interfaces 92, 94. Upon a packet being received by the network interfaces 92, 94 via the LAN 4, etc., the MAC controller 72 supplies a packet interruption request signal to one of the two interrupt controllers 26, 32. In detail, when a packet is received while the main CPU 20 is in the non-sleeping state, the MAC controller 72 supplies the packet interruption request signal to the main interrupt controller 26. On the other hand, when the packet is received while the main CPU 20 is in the sleeping state, the MAC controller 72 supplies the packet interruption request signal to the sub interrupt controller 32.

The flash memory 80 is mounted at the exterior of the ASIC 12. The flash memory 80 can be accessed from the CPUs 20, 30. The flash memory 80 stores the program 84, which is the compressed state of the programs 62, 91 executed by the CPUs 20, 30.

The SDRAM 90 can be accessed from the main CPU 20. The main CPU 20 stores, in the SDRAM 90, the packet received while the main CPU 20 is in the non-sleeping state. The SDRAM 90 has a total memory capacity greater than that of the SRAM 60, and can be accessed (read from, written into) faster by the CPUs 20, 30. Consequently, the power consumption of the SDRAM 90 is higher than the power consumption of the SRAM 60. The SDRAM 90 is controlled by the SDRAM control circuit 70, and transits between the normal behavior mode and the self refresh mode.

The multi-function device 10 is connected with the LAN 4 via the wired network interface 94. Further, the multi-function device 10 can also be connected with a wireless network (not shown) via the wireless network interface 92. The network interfaces 92, 94 supply a packet received via the network to the MAC controller 72.

The printer engine 96 comprises a printing mechanism such as an ink jet type, laser type. The printer engine 96 executes printing according to an instruction from the main CPU 20. The display panel 98 is an LCD. The display panel 98 displays information according to an instruction from the main CPU 20. Moreover, a backlight of the display panel 98 transits between an ON state and an OFF state according to an instruction from the main CPU 20.

(State Transiting of the Multi-Function Device)

Figure 2:
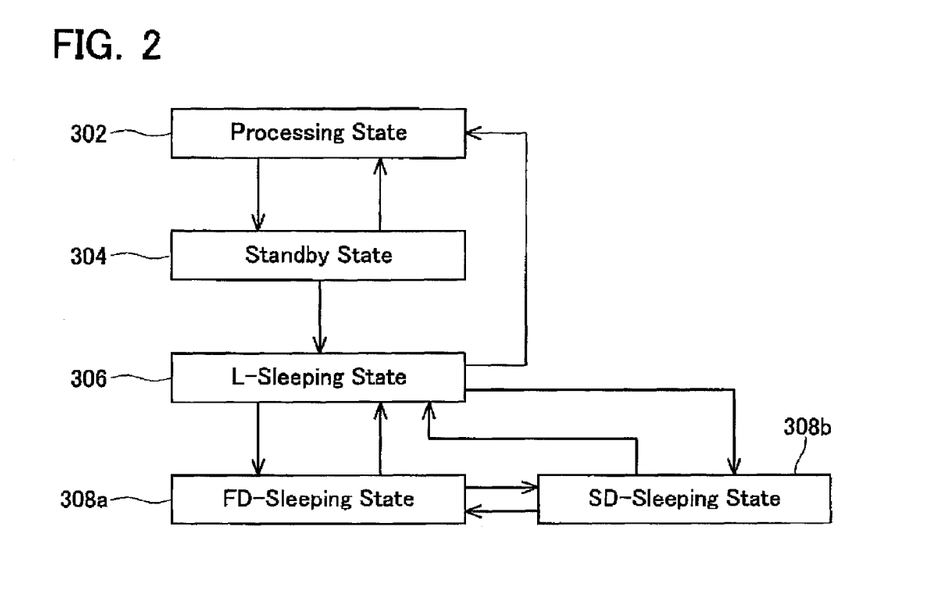
FIG. 2 shows an example of state transiting of the multi-function device.

As shown in FIG. 2, the multi-function device 10 transits its state between a processing state 302, a standby state 304, an L-(Light) sleeping state 306, an FD-(First Deep) sleeping state 308a and an SD-(Second Deep) sleeping state 308b.

(Standby State)

Figure 3:
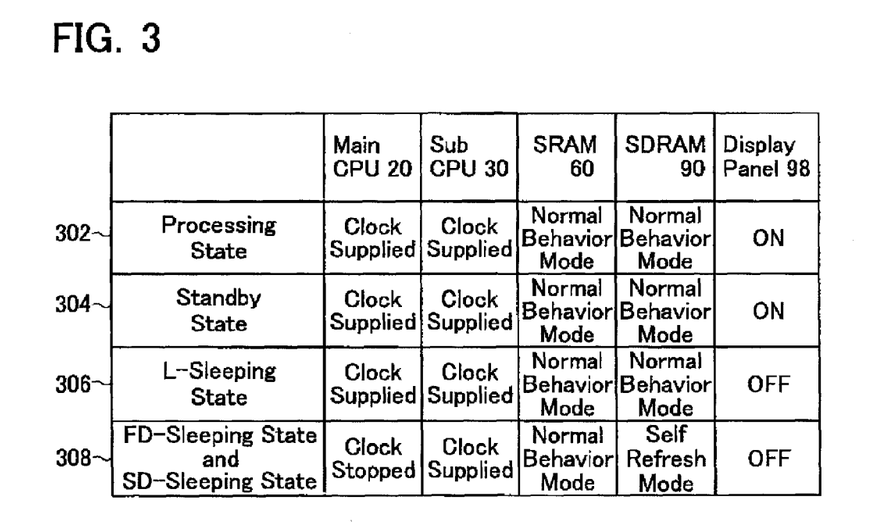
FIG. 3 shows an example of states of units corresponding to states of the multi-function device.

When the power supply of the multi-function device 10 is turned ON, the multi-function device 10 becomes the standby state 304. As shown in FIG. 3, in the standby state 304, the clock is supplied to the two CPUs 20, 30, and the two CPUs 20, 30 are in the non-sleeping state. Further, in the standby state 304, the two RAMs 60, 90 are in the normal behavior mode, and the display panel 98 is in the ON state.

(Processing State)

In a case where the multi-function device 10 is in the standby state 304 and the normal process should be executed, the multi-function device 10 transits to the processing state 302. Moreover, the normal process includes a printing process in accordance with a printing instruction packet, a displaying process executed when a user has performed an operation on the display panel 98, etc. As shown in FIG. 3, the state of the units 20, 30, etc. in the case of the processing state 302 is the same as in the case of the standby state 304. The difference between the processing state 302 and the standby state 304 is whether the main CPU 20 is executing the normal process. When the main CPU 20 ends the normal process, the multi-function device 10 transits to the standby state 304.

(L-Sleeping State)

When the multi-function device 10 transits to the standby state 304, the timer clock circuit 52 starts supplying the clock signal to the timer 50. Thereby, the timer 50 executes a countdown from an initial value (e.g., 5 minutes). When the count value of the timer 50 reaches "0", the timer 50 supplies a timer interruption request signal to the main CPU 20 via the main interrupt controller 26. Consequently, the main CPU 20 turns the backlight of the display panel 98 to the OFF state. Thereby, the multi-function device 10 transits to the L-sleeping state 306.

In the L-sleeping state 306, the two CPUs 20, 30 are in the non-sleeping state, the two RAMs 60, 90 are in the normal behavior mode, and the backlight of the display panel 98 is in the OFF state. Thereby, the power consumed by the display panel 98 can be reduced. In the L-sleeping state 306, if the main CPU 20 should execute the normal process (printing process, displaying process, etc.), the multi-function device 10 transits to the processing state 302. At this juncture, the main CPU 20 supplies an instruction to the timer 50 to return the count value of the timer 50 to the initial value. Thereby, when ending the processing state 302 and transiting again to the standby state 304, the timer 50 again executes the countdown from the initial value.

(FD-Sleeping State, SD-Sleeping State)

Figure 6:
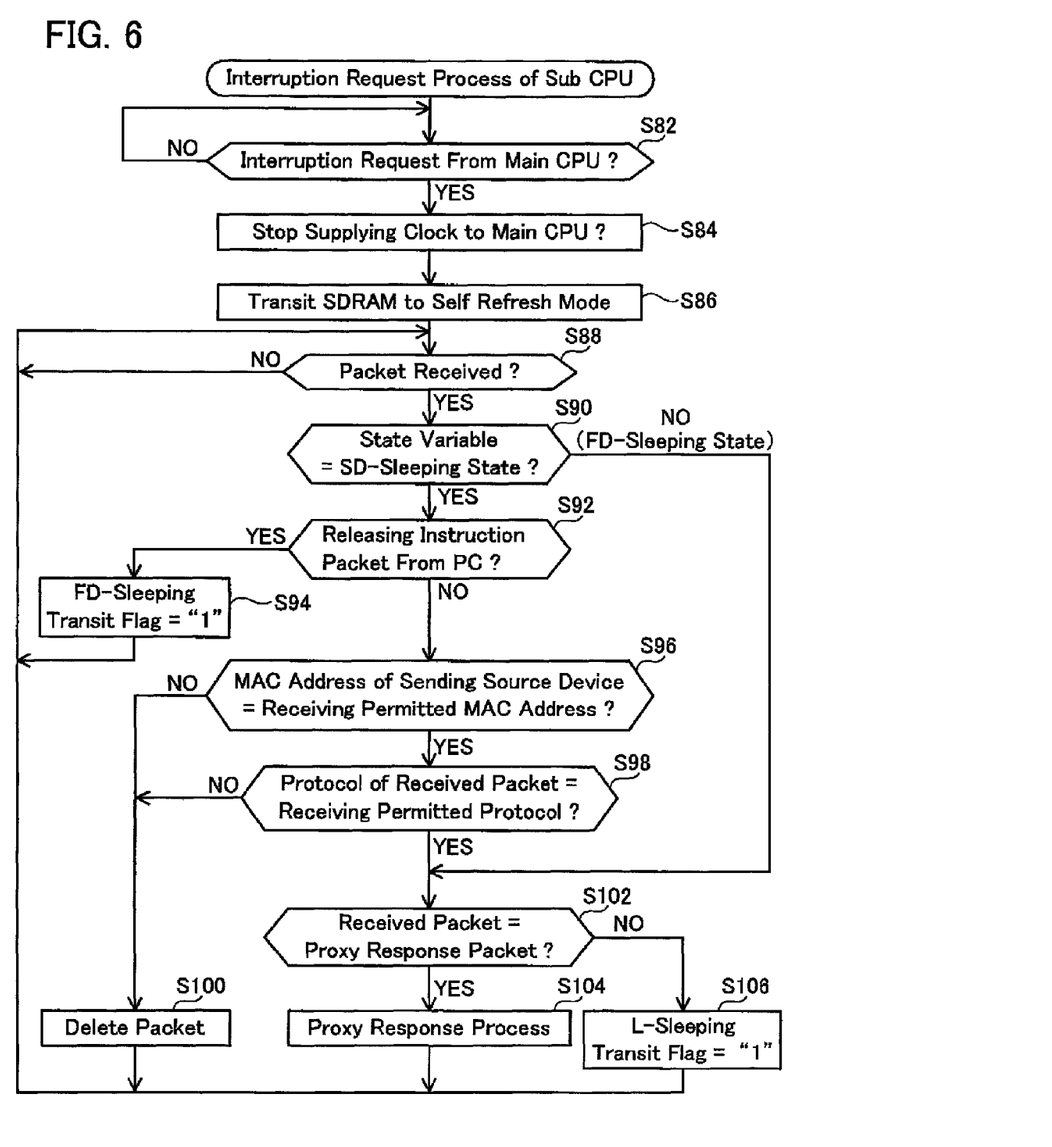
FIG. 6 shows a flowchart of an interruption request process executed by a sub CPU.

The multi-function device 10 transits from the L-sleeping state 306 to the FD-sleeping state 308a or the SD-sleeping state 308b by the sub CPU 30 executing a transiting process of S84, S86 of FIG. 6 (to be described). In the FD-sleeping state 308a and the SD-sleeping state 308b, the main CPU 20 is in the sleeping state, the sub CPU 30 is in the non-sleeping state, the SRAM 60 is in the normal behavior mode, the SDRAM 90 is in the self refresh mode, and the backlight of the display panel 98 is in the OFF state. That is, from the viewpoint of power consumption, the state of the CPUs 20, 30 in the SD-sleeping state 308b is a state identical to the case of the FD-sleeping state 308a (i.e., the main CPU 20 is in the sleeping state and the sub CPU 30 is in the non-sleeping state), and the mode of the RAMs 60, 90 is the same mode as in the case of the FD-sleeping state 308a. The state of the multi-function device 10, from among the FD-sleeping state 308a and the SD-sleeping state 308, is determined by whether the state variable stored in the SRAM 60 is a value indicating the FD-sleeping state 308a or a value indicating the SD-sleeping state 308b.

In the FD-sleeping state 308a and the SD-sleeping state 308b, in a case where the main CPU 20 should execute the normal process (printing process, displaying process, etc.), the multi-function device 10 transits to the processing state 302 via the L-sleeping state 306. Further, in a case where the main CPU 20 should execute a response process for a packet received while in the FD-sleeping state 308a or the SD-sleeping state 308b, the multi-function device 10 transits to the L-sleeping state 306.

(Configuration of PC)

As shown in FIG. 1, the PC 100 comprises a processing unit 104. The PC 100 can store a process permission table 102. The process permission table 102 is created by the user of the PC 100. A plurality of combinations 102a to 102e of MAC address and protocol type is recorded in the process permission table 102. The protocol type "ALL" recorded in the combination 102c means all types of protocols. Moreover, a combination of MAC address and protocol type need not be recorded in the process permission table 102.

(Transit Instruction Packet)

If the user of the PC 100 wishes to cause the multi-function device 10 to transit to the SD-sleeping state 308b, the user performs a predetermined first operation on an operation unit (not shown) of the PC 100. In the case where the first operation is performed, the processing unit 104 generates a transit instruction packet that includes the process permission table 102 stored in the PC 100 and an SD transit command instructing transit to the SD-sleeping state 308b. In a case of a combination not being recorded in the process permission table 102, the processing unit 104 generates a transit instruction packet that does not include the process permission table 102. Moreover, in a variant, the PC 100 may permit the user to select whether to include the process permission table 102 in the transit instruction packet.

When the first operation is to be executed, the user of the PC 100 can further input a transit time for causing the multi-function device 10 to transit from the SD-sleeping state 308b to the FD-sleeping state 308a. In a variant, the user of the PC 100 may be able to input a transit timing (e.g., time elapsed since transiting to the SD-sleeping state 308b) for causing the multi-function device 10 to transit from the SD-sleeping state 308b to the FD-sleeping state 308a. If the transit time is input, the processing unit 104 generates a transit instruction packet that further includes transit time information indicating the transit time (in the variant: transit timing).

Moreover, when the first operation is to be executed, the user of the PC 100 can further input a temporal releasing time for causing the multi-function device 10 to transit temporarily from the SD-sleeping state 308b to the L-sleeping state 306. Moreover, in a variant, the user of the PC 100 may be able to input a release timing (e.g., time elapsed since transiting to the SD-sleeping state 308b) for releasing the SD-sleeping state 308b. In a case where the temporal releasing time is input, the processing unit 104 generates a transit instruction packet that further includes temporal releasing time information indicating the temporal releasing time (release timing).

Moreover, in the present embodiment, the processing unit 104 can generate the transit instruction packet that includes at least one of the transit time information and the temporal releasing time information. However, in a variant, the processing unit 104 may generate a time information packet different from the transit instruction packet, the time information packet including at least one of the transit time information and the temporal releasing time information. In this case, the processing unit 104 may send the time information packet to the multi-function device 10 at a timing different from the sending timing of the transit instruction packet.

(Releasing Instruction Packet)

In wishing to cause the multi-function device 10 to transit from the SD-sleeping state 308b to the FD-sleeping state 308a, the user of the PC 100 performs a predetermined second operation on the operation unit (not shown) of the PC 100. In the case where the second operation is executed, the processing unit 104 generates a releasing instruction packet that includes an SD release command instructing to release the SD-sleeping state 308b and transit to the FD-sleeping state 308a.

After generating the transit instruction packet or the releasing instruction packet, the processing unit 104 sends the generated packet to the multi-function device 10.

(Packet Receiving Process Executed by Main CPU)

Figure 4:
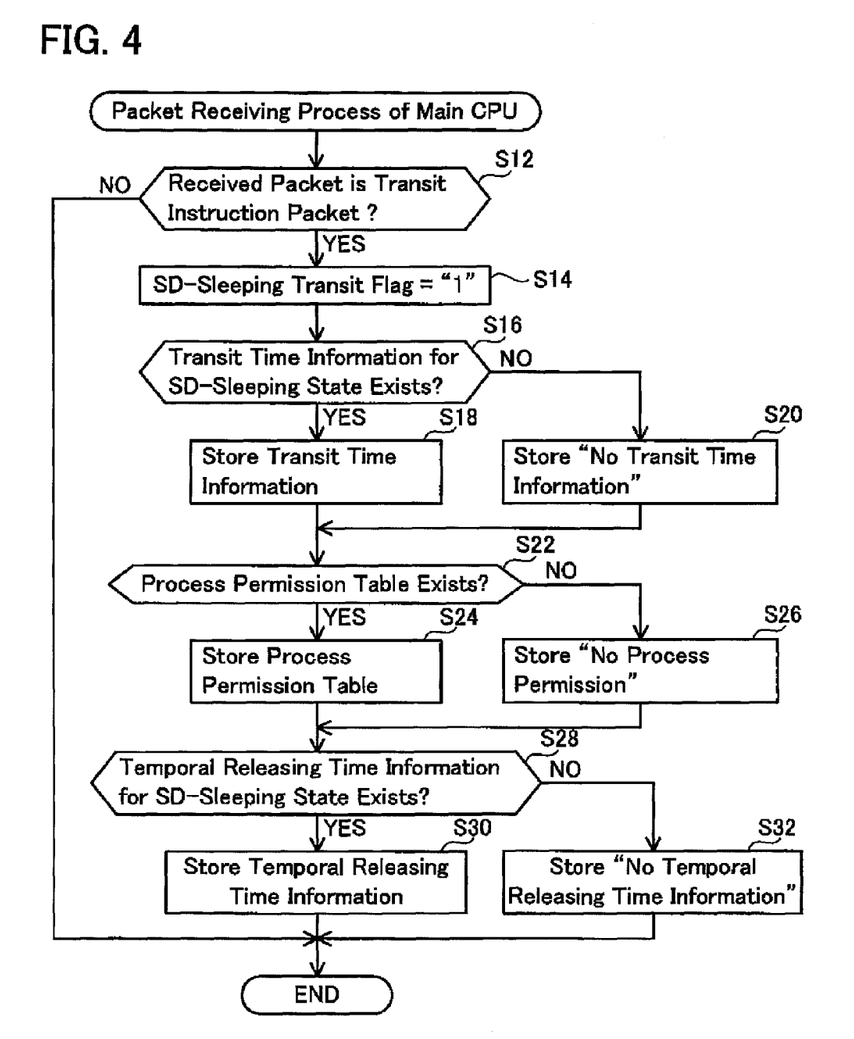
FIG. 4 shows a flowchart of a packet receiving process executed by a main CPU.

Next, the contents of a process executed by the main CPU 20 in the non-sleeping state will be described. Moreover, the main CPU 20 that is in the sleeping state cannot execute processes. As shown in FIG. 4, when the multi-function device 10 executes a receiving process for a packet, the main CPU 20 executes a packet receiving process. Specifically, in the case where a packet is received by either of the network interfaces 92, 94, the MAC controller 72 supplies a packet interruption request signal to the main CPU 20 via the main interrupt controller 26. Upon acquiring the packet interruption request signal, the main CPU 20 moves the received packet from the network interfaces 92, 94 to the SDRAM 90. The process whereby the main CPU 20 moves the received packet to the SDRAM 90 is equivalent to the receiving process.

In S12, the main process performing unit 24 analyses the packet moved to the SDRAM 90 in the receiving process, and determines whether the received packet is the transit instruction packet. Specifically, in the case where the SD transit command instructing transition to the SD-sleeping state 308b is included in the received packet, the main process performing unit 24 determines YES in S12 and, in the case where the SD transit command is not included, determines NO in S12.

In the case of NO in S12, the main process performing unit 24 ends the packet receiving process. Moreover, although not shown in the flowchart, in this case, the main process performing unit 24 executes a packet process according to the received packet. The packet process includes, e.g., a response process to the received packet, a printing process and a registration process. The registration process is executed as a preceding step for the external device to cause the multi-function device 10 to execute the printing process. The registration process consists of advance storage, in the multi-function device 10, of identification information such as a MAC address of the external device, the user ID of the user of the external device, etc. In a case of receiving a packet for executing the printing process from an external device which corresponds to the identification information stored in the registration process, the multi-function device 10 executes the printing process. Moreover, in a case of executing the registration process in accordance with the received packet, the main CPU 20 does not execute a response to the received packet.

In the case of YES in S12, the main process performing unit 24 stores, in the SDRAM 90, a MAC address of a sending source device (the PC 100 in the present embodiment) included in the transit instruction packet. Next, in S14, the main process performing unit 24 changes the SD-sleeping transit flag in the SDRAM 90 to "1". Consequently, YES is determined in S46 of FIG. 5 (to be described), and the multi-function device 10 is transited to the SD-sleeping state 308b (S84, S86 of FIG. 6).

Next, in S16, the main process performing unit 24 determines whether the transit time information is included in the received transit instruction packet. In a case of YES in S16, in S18 the main process performing unit 24 stores the transit time information in the SDRAM 90, and proceeds to S22. In a case of NO in S16, in S20 the main process performing unit 24 stores information in the SDRAM 90 indicating there is no transit time information, and proceeds to S22.

In S22, the main process performing unit 24 determines whether the process permission table 102 is included in the received transit instruction packet. In a case of YES in S22, in S24 the main process performing unit 24 stores the process permission table 102 in the SDRAM 90, and proceeds to S28. In a case of NO in S22, in S26 the main process performing unit 24 stores information in the SDRAM 90 indicating there is no process permission table 102, and proceeds to S28.

In S28, the main process performing unit 24 determines whether the temporal releasing time information is included in the received transit instruction packet. In a case of YES in S28, in S30 the main process performing unit 24 stores the temporal releasing time information in the SDRAM 90, and ends the packet receiving process. In a case of NO in S28, in S32 the main process performing unit 24 stores information in the SDRAM 90 indicating there is no temporal releasing time information, and ends the packet receiving process.

(State Transit Process Executed by Main CPU)

Figure 5:
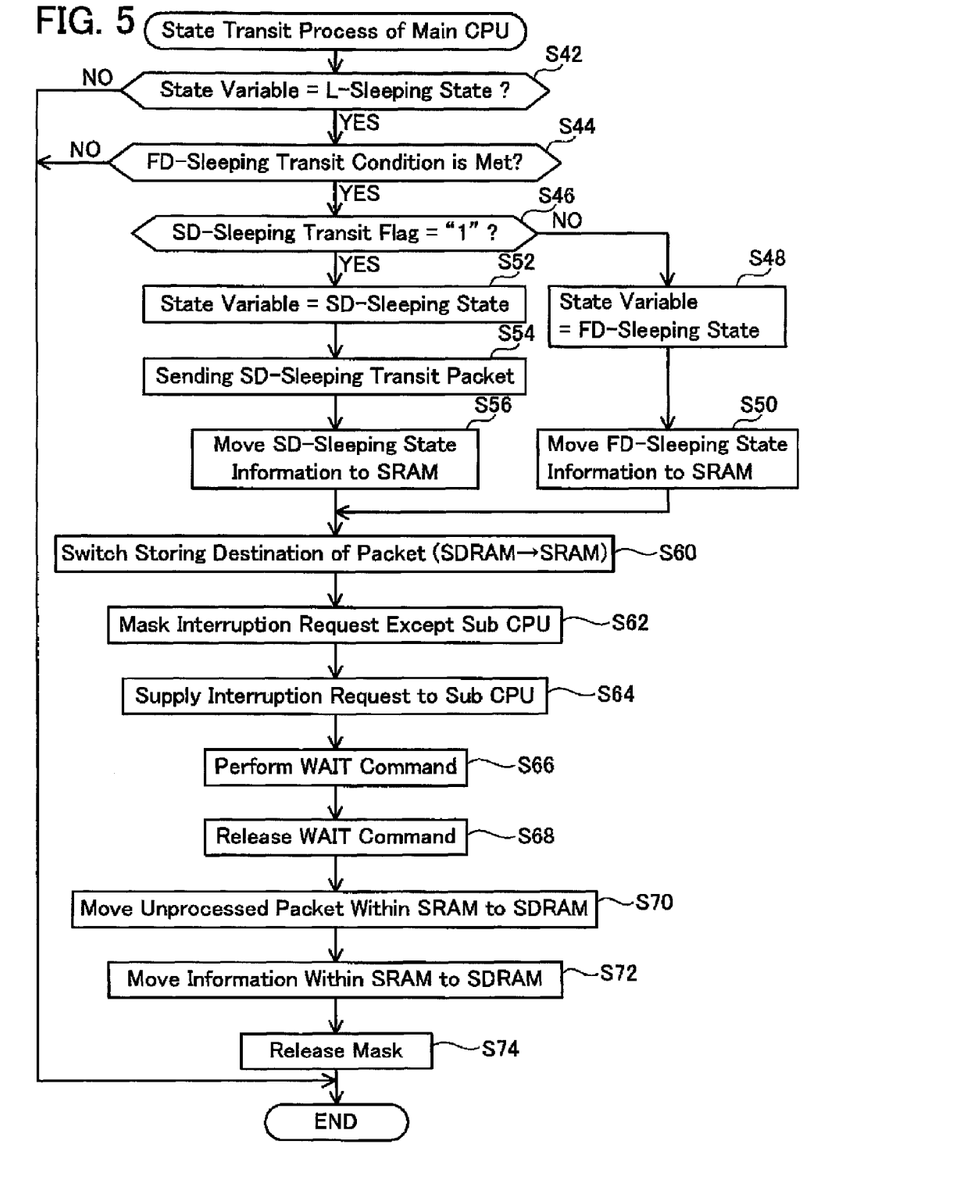
FIG. 5 shows a flowchart of a state transit process executed by the main CPU.

While the main CPU 20 is in the non-sleeping state (i.e., any of the processing state 302, the standby state 304 and the L-sleeping state 306), the main CPU 20 regularly (e.g., at 1 second intervals) executes the state transit process of FIG. 5. As shown in FIG. 5, first, in S42 the main CPU 20 determines whether a state variable stored in the SRAM 60 is a value indicating the L-sleeping state 306. In a case where the state variable indicates other than the L-sleeping state 306 (S42: NO), the main CPU 20 ends the state transit process. Moreover, while the main CPU 20 is in the non-sleeping state, the multi-function device 10 is necessarily in one state from among the processing state 302, the standby state 304 and the L-sleeping state 306. That is, in S42, the state variable is a value indicating one of the processing state 302, the standby state 304 or the L-sleeping state 306, and is not a value indicating one of the FD-sleeping state 308a or the SD-sleeping state 308b.

(Determination of FD-Sleeping Transit Condition; S44)

In a case where the state variable indicates the L-sleeping state 306 (S42: YES), in S44 the main CPU 20 determines whether an FD-sleeping transit condition is met. Specifically, the main CPU 20 makes a determination for a plurality of conditions that include, e.g., (1) whether the multi-function device 10 is in the process of sending a packet to the exterior, (2) whether an unprocessed packet is being stored in the SDRAM 90, (3) whether there is a device (e.g., the PC 100) that connects by a TCP connection to the multi-function device 10, (4) whether a process to activate or shut down the multi-function device 10 is being executed, (5) whether a load on the network is high.

For example, in a case where the main CPU 20 is responding to a packet from the PC 100, etc., YES is determined in (1). For example, in a case where the multi-function device 10 has a Web server function, and the PC 100 currently connects by the TCP connection with the Web server of the multi-function device 10, YES is determined in (3). For example, in a case where a number of packets received in a predetermined time period immediately prior to executing the process S44 exceeds a predetermined number, the probability of the multi-function device 10 receiving a packet to be processed is high, and consequently YES is determined in (5).

In a case where all of the plurality of conditions (e.g., the conditions (1) to (5) above) are determined negatively, the FD-sleeping transit condition is met, and consequently the main CPU 20 determines YES in S44.

In the case where it is determined that the FD-sleeping transit condition is not met (S44: NO), the main CPU 20 ends the state transit process. In the case where it is determined that the FD-sleeping transit condition is met (S44 in YES), in S46 the main CPU 20 determines whether the SD-sleeping transit flag in the SDRAM 90 is "1". Moreover, when the multi-function device 10 receives the transit instruction packet (YES in S12 of FIG. 4), the SD-sleeping transit flag is "1" (S14 of FIG. 4), and in the case where the multi-function device 10 is transited from the SD-sleeping state 308b to the FD-sleeping state 308a (YES in S112 or YES in S120 of FIG. 7 (to be described)), the SD-sleeping transit flag is "0".

(Process in Case of SD-Sleeping Transit Flag="0"; S48 to S50)

In the case where the SD-sleeping transit flag is "0" (S46: NO), in S48 the main CPU 20 changes the state variable in the SRAM 90 to a value indicating the FD-sleeping state 308a. Next, in S50, the main CPU 20 moves the FD-sleeping state information being stored in the SDRAM 90 to the SRAM 60.

The FD-sleeping state information is information that the sub CPU 30 requires for executing processes in the case where the multi-function device 10 is in the FD-sleeping state 308a. The FD-sleeping state information includes, e.g., MIB (Management Information Base) statistical information (e.g., total number of received packets), packet ID (ID to be given to sending packets), link status information (information indicating whether the multi-function device 10 is connected with a network (e.g., the LAN 4)), FD-sleeping release time information (to be described), various information about the multi-function device 10 (IP address, MAC address, host name of NetBIOS, SNMP community name, node name, mDNS device name), proxy response information (to be described), SDRAM descriptor information (information indicating storable addresses when data is to be stored in the SDRAM 90), multicast address information (multicast addresses capable of receiving) and UDP port information (information indicating valid UDP ports and invalid UDP ports). In a variant, the FD-sleeping state information may include IP address filter information (information indicating IP addresses to be filtered) and invalid protocol information (types of protocol that the multi-function device 10 does not process).

Moreover, the FD-sleeping release time information indicates a time of transiting from the FD-sleeping state 308*a* to the L-sleeping state 306. For example, in a case where the IP address of the multi-function device 10 is assigned from a DHCP (Dynamic Host Configuration Protocol) server, the multi-function device 10 may need to regularly execute a process to update the IP address. In such a situation, the FD-sleeping state information includes the FD-sleeping release time that indicates a time when the IP address is to be updated.

The proxy response information is information for the sub CPU 30 to execute the packet process in accordance with the received packet on behalf of the main CPU 20 while the main CPU 20 is in the sleeping state (while the multi-function device 10 is in the FD-sleeping state 308*a* or SD-sleeping state 308*b*), and includes information (e.g., information indicating the status of the multi-function device 10, such as remaining amount in an ink cartridge or a toner cartridge of the printer engine 96, etc.) other than the information (e.g., the IP address of the multi-function device 10) included in the FD-sleeping state information.

(Process in Case of SD-Sleeping Transit Flag="1"; S52 to S56)

In the case where it is determined that the SD-sleeping transit flag in the SDRAM 90 is "1" (S46: YES), in S52 the main CPU 20 changes the state variable in the SRAM 60 to a value indicating the SD-sleeping state 308*b*. Next, in S54, the main CPU 20 sends an SD-sleeping transit packet that includes information indicating transiting of the multi-function device 10 to the SD-sleeping state 308*b*, with the IP address of a specific external device (e.g., the PC 100), specified previously by the user, as the destination. Thereby, the specific external device can learn that the multi-function device 10 is transiting to the SD-sleeping state 308*b*. Moreover, in another embodiment, the main CPU 20 may broadcast the SD-sleeping transit packet.

Next, in S56, the main CPU 20 moves SD-sleeping state information stored in the SDRAM 90 to the SRAM 60. The SD-sleeping state information includes the FD-sleeping state information, the SD-sleeping transit flag and the MAC address of the sending source device (i.e., the PC 100) of the transit instruction packet. The SD-sleeping state information further includes either the transit time information or information indicating no transit time information (S18 or S20 of FIG. 4), either the process permission table 102 or information indicating no process permission table (S24 or S26 of FIG. 4) and either the temporal releasing time information or information indicating no temporal releasing time information (S30 or S32 of FIG. 4).

(Processes Until Executing WAIT Command; S60 to S66)

In S60, the main CPU 20 switches the RAM for storing the packet received via the LAN 4, etc. from the SDRAM 90 to the SRAM 60. Next, in S62, the main CPU 20 masks (prohibits) interruption requests except from the sub CPU 30. Next, in S64, the main CPU 20 supplies, via the sub interrupt controller 32, a start interruption request signal to the sub CPU 30 for causing the sub CPU 30 to start processes. Next, in S66, the main CPU 20 executes a WAIT command. When the WAIT command is executed, the main CPU 20 assumes an execution halting state in which it remains on standby until an interruption request signal is supplied.

(Processes after Releasing WAIT Command; S68 to S74)

In S68, when the interruption request signal is supplied from the sub CPU 30 (see S134 of FIG. 7: to be described), the main CPU 20 releases the WAIT command, and proceeds to S70. In S70, the main CPU 20 moves the unprocessed packet stored in the SRAM 60 to the SDRAM 90. In S72, the main CPU 20 moves the FD-sleeping state information or the SD-sleeping state information stored in the SRAM 60 to the SDRAM 90. Next, in S74, the main CPU 20 releases the mask executed in S62, and ends the state transit process.

(Process Executed by Sub CPU)

Next, the contents of an interruption request process of FIG. 6 executed by the sub CPU 30 will be described. The interruption request process of FIG. 6 is started when the power supply of the multi-function device 10 is turned ON. The sub CPU 30 executes the process below in accordance with the program 62. Moreover, in a variant, the sub CPU 30 may execute the process below according to a program stored in the flash memory 80.

When the power supply of the multi-function device 10 is turned ON, the sub CPU 30 executes the WAIT command so as to wait until the interruption request signal is supplied (S82). As described above, in S64 of FIG. 5 the main CPU 20 supplies the start interruption request signal to the sub CPU 30. In this case, YES is determined in S82.

(Transit Process to FD-Sleeping State or SD-Sleeping State; S84 to S86)

In the case of YES in S82, the transit control unit 34 instructs the main clock circuit 28 to stop supplying the clock (S84). Consequently, the main CPU 20 transits from the non-sleeping state to the sleeping state. Next, the transit control unit 34 causes the SDRAM 90 to transit from the normal behavior mode to the self refresh mode (S86). Thereby, the multi-function device 10 assumes the FD-sleeping state 308*a* or the SD-sleeping state 308*b*. Moreover, while the SDRAM 90 is in the self refresh mode, the multi-function device 10 cannot store a received packet in the SDRAM 90.

(Process Concerning Receiving Packet; S88)

In S88, the sub CPU 30 monitors whether a packet is received. Specifically, in a case where a packet is received by either of the network interfaces 92, 94, the MAC controller 72 supplies a packet interruption request signal to the sub CPU 30 via the sub interrupt controller 32. When the packet interruption request signal is supplied from the MAC controller 72, the sub CPU 30 executes the packet receiving process to move the received packet from the network interfaces 92, 94 to the SRAM 60. When the packet receiving process is executed (S88: YES), the sub CPU 30 stores the received packet in the SRAM 60.

Next, in S90, the sub CPU 30 determines whether the state variable in the SRAM 60 is a value indicating the SD-sleeping state 308*b*. In a case where the state variable is a value indicating the FD-sleeping state 308*a* (S90: NO), the sub CPU 30 skips S92 to S100, and proceeds to S102.

(Process in Case of State Variable=SD-Sleeping State; S92 to S100)

In a case where the state variable is a value indicating the SD-sleeping state 308*b* (S90: YES), in S92 the sub CPU 30 determines whether the packet received in S88 is a releasing instruction packet sent from the PC 100. The determination of S92 includes determining whether the MAC address of the sending source device included in the packet received in S88 matches the MAC address of the sending source device (i.e., the PC 100) of the transit instruction packet, and determining whether the SD release command is included in the packet received in S88.

In a case of YES in S92, in S94 the sub CPU 30 changes an FD-sleeping transit flag in the SRAM 60 to "1", and returns to S88. Consequently, YES is determined in process S112 of FIG. 7 (to be described), and the multi-function device 10 transits to the ED-sleeping state 308*a* (S124 of FIG. 7). Further, in S126 of FIG. 7, the sub CPU 30 changes the FD-sleeping transit flag to "0". In a case of NO in S92, the determining unit 36 executes a determining process (S96, S98). In S96, the determining unit 36 determines whether the MAC address of the sending source device included in the packet received in S88 has been recorded in the process permission table 102 stored in the SRAM 60. In a case of NO in S96, the sub CPU 30 proceeds to S100. In a case where no process permission (information indicating no process permission table) is being stored in the SRAM 60, the determining unit 36 determines NO in S96. Moreover, in a case where the combination of MAC address and protocol type is not recorded in the process permission table 102, the determining unit 36 determines NO in S96 even if the MAC address of the sending source device included in the packet received in S88 is any of the MAC addresses, i.e., even if the packet received in S88 is any type of packets.

In a case of YES in S96, in S98 the determining unit 36 extracts, from the process permission table 102, a protocol (called "specific protocol" below) combined with the MAC address of the sending source device of the packet received in S88. In S98, further, the determining unit 36 determines whether the protocol of the packet received in S88 matches the specific protocol (S98). In a case of NO in S98, the sub CPU 30 proceeds to S100, and in a case of YES in S98, the sub CPU 30 proceeds to S102.

In S100, the sub CPU 30 deletes the packet received in S88, and returns to S88. According to this configuration, in the case where the multi-function device 10 is in the SD-sleeping state 308*b*, the sub CPU 30 can properly determine, corresponding to the sending source device of the packet and the protocol of the packet, whether this is a packet the sub CPU 30 should process. Consequently, since the number of packets to be processed may be reduced, the power consumption of the multi-function device 10 may be reduced. Moreover, in this configuration, in the case where the combination of MAC address and protocol type is not recorded the process permission table 102, packets, except for the releasing instruction packet (S92: YES) from the PC 100 (i.e., the sending source device of the transit instruction packet), received while the multi-function device 10 is in the SD-sleeping state 308*b* (S88: YES) are deleted without the packet process being performed (S100).

In S102, the sub CPU 30 determines whether the packet received in S88 can be responded to by the sub CPU 30 on behalf of the main CPU 20. Specifically, the sub CPU 30 determines whether it can execute a response process by utilizing information included in the FD-sleeping state information or the SD-sleeping state information stored in the SRAM 60 in accordance with the packet received in S88. The response processes that the sub CPU 30 can execute as a proxy include, e.g., a response to PING, a response to an ARP (Address Resolution Protocol) packet, etc.

In a case where the sub CPU 30 can execute a response as a proxy (S102: YES), the sub process performing unit 38 executes the response process in accordance with the packet received in S88 (S104), and returns to S88. In a case where the sub CPU 30 cannot execute the response as the proxy (S102: NO), the sub process performing unit 38 changes an L-sleeping transit flag in the SRAM 60 to "1" (S106), and returns to S88. Consequently, in process S128 of FIG. 7 (to be described), YES is determined, and the multi-function device 10 is transited to the L-sleeping state 306 (S130 to S134 of FIG. 7). Moreover, in S138 of FIG. 7, the L-sleeping transit flag is changed to "0" by the sub CPU 30.

(State Transit Process Executed by Sub CPU)

Figure 7:
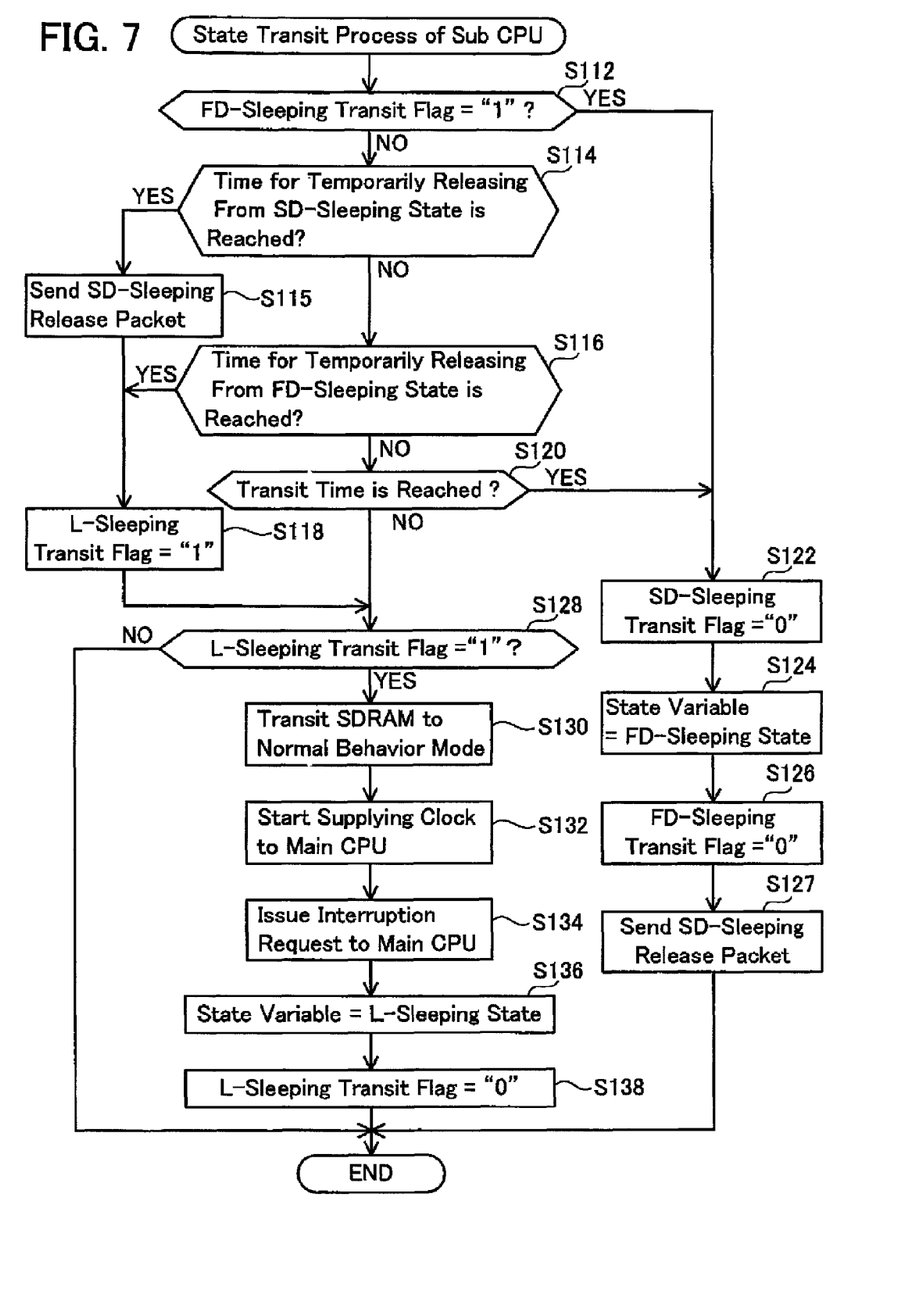
FIG. 7 shows a flowchart of a state transit process executed by the sub CPU.

While the main CPU 20 is in the sleeping state (i.e., the FD-sleeping state 308*a* or the SD-sleeping state 308*b*), the sub CPU 30 regularly (e.g., at 50 millisecond intervals) executes the state transit process of FIG. 7. The state transit process executed by the sub CPU 30 is executed at shorter intervals than the state transit process executed by the main CPU 20 (see FIG. 5). This is because there are many processes to be executed by the main CPU 20 while the main CPU 20 is in the non-sleeping state, but there are not so many processes to be executed by the sub CPU 30 while the main CPU 20 is in the sleeping state.

In FIG. 7, first, the sub CPU 30 determines in S112 whether the FD-sleeping transit flag stored in the SRAM 60 is "1". In a case where the FD-sleeping transit flag is "1" (S112: YES), the sub CPU 30 proceeds to S122. In a case where the FD-sleeping transit flag is not "1" (S112: NO), the sub CPU 30 proceeds to S114.

(Process in Case of FD-Sleeping Transit Flag="0"; S114 to S120)

In S114, the sub CPU 30 determines whether the current time has reached a time to perform the temporary releasing indicated by the temporal releasing time information in the SRAM 60. In a case of YES in S114, the sub CPU 30 proceeds to S115, and in a case of NO in S114, the sub CPU 30 proceeds to S116. Moreover, in a case where no temporal releasing time information (information indicating no temporal releasing time information) is being stored in the SRAM 60, NO is determined in S114.

In S115, the sub CPU 30 sends an SD-sleeping release packet that includes information indicating that the SD-sleeping state 308*b* should be released, with the IP address of the specific external device (e.g., the PC 100) as the destination. In this configuration, by receiving the SD-sleeping release packet, the specific external device can be informed that the multi-function device 10 has become able to execute the packet process. Moreover, the sub CPU 30 may broadcast the SD-sleeping release packet. When S115 ends, the sub CPU 30 proceeds to S118.

In S116, the sub CPU 30 determines whether the current time has reached a time to release from the FD-sleeping state indicated by the FD-sleeping release time information in the SRAM 60. In a case of YES in S116, the sub CPU 30 proceeds to S118, and in a case of NO in S116, the sub CPU 30 proceeds to S120. In S118, the sub CPU 30 changes the L-sleeping transit flag in the SRAM 60 to "1", and proceeds to S128. Consequently, YES is determined in process of S128 (to be described), and the multi-function device 10 is transited to the L-sleeping state 306 (S130 to S134 of FIG. 7). Moreover, the L-sleeping transit flag is changed to "0" by the sub CPU 30 in S138 of FIG. 7.

In S120, the sub CPU 30 determines whether the transit time indicated by the transit time information in the SRAM 60 has reached the current time. In a case of YES in S120, the sub CPU 30 proceeds to S122, and in a case of NO, the sub CPU 30 proceeds to S128. Moreover, in a case where no transit time information is being stored in the SRAM 60, the sub CPU 30 determines NO in S120.

(Process in Case of FD-Sleeping Transit Flag="1" or Process in Case of Transit Time has been Reached; S122 to S127)

In S122, the sub CPU 30 changes the SD-sleeping transit flag in the SRAM 60 to "0". Next, in S124, the sub CPU 30 changes the state variable in the SRAM 60 to a value indicating the FD-sleeping state 308a. Consequently, the multi-function device 10 transits to the FD-sleeping state 308a. Next, in S126, in a case where the FD-sleeping transit flag is "1", the sub CPU 30 changes the FD-sleeping transit flag to "0". Moreover, in a case where the FD-sleeping transit flag is "0" (in the case of YES in S120), the sub CPU 30 does not change the FD-sleeping transit flag. Next, in S127, the sub CPU 30 sends the SD-sleeping release packet to the specific external device, and ends the state transit process.

In S128, the sub CPU 30 determines whether the L-sleeping transit flag in the SRAM 60 is "1". In a case where the L-sleeping transit flag is "0" (S128: NO), the sub CPU 30 ends the state transit process. In a case where the L-sleeping transit flag is "1" (S128: YES), the sub CPU 30 proceeds to S130.

(Process in Case of L-Sleeping Transit Flag="1"; S130 to S138)

In S130, the transit control unit 34 causes the SDRAM 90 to transit from the self refresh mode to the normal behavior mode. Moreover, the transit control unit 34 further switches the RAM storing the packet received from the external device (e.g., the PC 100) from the SRAM 60 to the SDRAM 90. Next, in S132, the transit control unit 34 instructs the main clock circuit 28 (see FIG. 1) to start the clock supply to the main CPU 20. Consequently, the clock is supplied to the main CPU 20, and the main CPU 20 transits from the sleeping state to the non-sleeping state. In S134, the transit control unit 34 supplies the start interruption request signal to the main CPU 20 via the main interrupt controller 26. Consequently, the WAIT command of S68 of FIG. 5 is released, and the main CPU 20 executes the process S70 of FIG. 5. Thereby, the multi-function device 10 is transited to the L-sleeping state 306. The sub CPU 30 changes the state variable in the SRAM 60 to a value indicating the L-sleeping state 306 (S136), and changes the L-sleeping transit flag to "0" (S138).

According to the above process, the multi-function device 10 is transited to the L-sleeping state 306, and the state transit process (FIG. 5) is executed by the main CPU 20. Moreover, in the case of being transited from the SD-sleeping state 308b to the L-sleeping state 306 due to the current time having reached the temporal releasing time (S114: YES), the SD-sleeping transit flag maintains the "1" state without being changed from "1" to "0". In this situation, if a process to be executed by the main CPU 20 (e.g., a process for updating the IP address from the DHCP server) is executed while the multi-function device 10 is in the L-sleeping state 306, NO is determined in S44 of FIG. 5 while the main CPU 20 is executing the process, and the L-sleeping state 306 is maintained. When the process to be executed by the main CPU 20 ends, YES is determined in S44 of FIG. 5. In S46 of FIG. 5, which is executed next, the SD-sleeping transit flag is "1" and, consequently, the multi-function device 10 is transited from the L-sleeping state 306 to the SD-sleeping state 308b. Thereby, the multi-function device 10 is transited temporarily from the SD-sleeping state 308b to the L-sleeping state 306, then returns to the SD-sleeping state 308b.

(Process Performed by PC)

Next, a process performed by the PC 100 will be described. Upon receiving the SD-sleeping transit packet (S54 of FIG. 5) from the multi-function device 10, the processing unit 104 of the PC 100 stores, in the PC 100, a specific combination of the MAC address of the multi-function device 10 included in the SD-sleeping transit packet, and information indicating that the multi-function device 10 is in the SD-sleeping state 308b.

Further, upon receiving the SD-sleeping release packet (S115 of FIG. 7) from the multi-function device 10, the processing unit 104 deletes the aforementioned specific combination from the PC 100.

Figure 8:
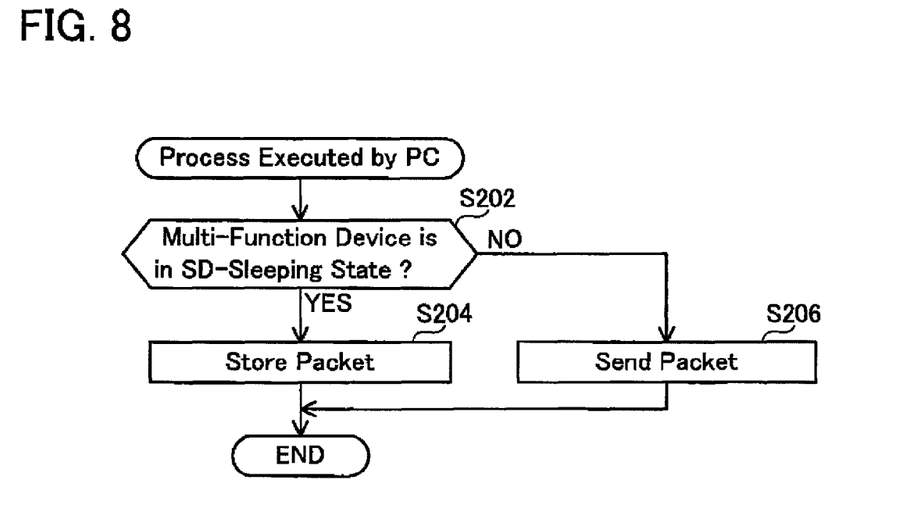
FIG. 8 shows a flowchart of a process executed by a PC.

The processing unit 104 executes the process shown in FIG. 8 when, as a trigger, the user of the PC 100 has executed an operation for sending a packet to the multi-function device 10. The processing unit 104 determines whether the multi-function device 10 is in the SD-sleeping state 308b (S202). Specifically, the processing unit 104 determines whether the aforementioned specific combination is being stored in the PC 100. In a case where the aforementioned specific combination is being stored in the PC 100, the processing unit 104 determines that the multi-function device 10 is in the SD-sleeping state 308b (S202: YES). In this case, the processing unit 104 stores the packet to be sent in the PC 100 (S204).

In the case where the aforementioned specific combination is not being stored in the PC 100, the processing unit 104 determines that the multi-function device 10 is not in the SD-sleeping state 308b (S202: NO). In this case, the processing unit 104 sends the packet to be sent to the multi-function device 10 (S206). Moreover, in S206, the processing unit 104 also sends, to the multi-function device 10, a packet already stored in the PC 100 from the previous processes S204. According to this configuration, the PC 100 need not send the packets while the multi-function device 10 is in the SD-sleeping state 308b. Consequently, it is possible to prevent a packet from being deleted without the multi-function device 10 having executed a process in accordance with the packet. Further, if the user commands a packet to be sent while the multi-function device 10 is in the SD-sleeping state 308b, the PC 100 stores the packet to be sent. After the multi-function device 10 has transited from the SD-sleeping state 308b to another state, the PC 100 sends the packet that was being stored. According to this configuration, the user of the PC 100 determines the state of the multi-function device 10, diminishing the need to execute a command on the PC 100 for sending a packet to the multi-function device 10. Moreover, in the case where the SD-sleeping release packet has been received from the multi-function device 10 (see S115, S127 of FIG. 7), the processing unit 104 may determine whether a packet is being stored in the PC 100 which designates, as the destination, a MAC address that matches the MAC address of the sending source device (i.e., the multi-function device 10) included in the SD-sleeping release packet. If that packet is being stored in the PC 100, the processing unit 104 may send the stored packet to the multi-function device 10.

(Effect of Present Embodiment)

The multi-function device 10 of the present embodiment has been described in detail. In a case where the FD-sleeping transit condition is met (YES in S44 of FIG. 5) but the SD-sleeping transit flag is not "1" (NO in S46 of FIG. 5) (i.e., in a case where the transit instruction packet has not been received from the PC 100), the multi-function device 10 transits to the FD-sleeping state 308a. In the case where the FD-sleeping transit condition is met (YES in S44 of FIG. 5), and the SD-sleeping transit flag is "1" (YES in S46 of FIG. 5) (i.e., in the case where the transit instruction packet has been received from the PC 100), the multi-function device 10 transits to the SD-sleeping state 308b.

In a case where the multi-function device 10 receives a packet while the multi-function device 10 is in the SD-sleeping state 308b, the sub process performing unit 38 determines whether the MAC address of the sending source of the received packet and the protocol of the received packet correspond to any of the combinations 102a to 102e of the process permission table 102 (S96 and S98 of FIG. 6). In a case of not corresponding to any of the combinations 102a to 102e (NO in either S96 or S98 of FIG. 6), the sub process performing unit 38 does not execute a packet process in accordance with the received packet (S100 of FIG. 6). In the case where the multi-function device 10 receives a packet while the multi-function device 10 is in the FD-sleeping state 308a, the multi-function device 10 executes a process in accordance with the received packet regardless of the process permission table 102.

That is, there are fewer types of packet for which the multi-function device 10 should execute the packet process while the multi-function device 10 is in the SD-sleeping state 308b than while the multi-function device 10 is in the FD-sleeping state 308a. That is, while the multi-function device 10 is in the SD-sleeping state 308b, the power expended on the packet process can be suppressed compared to while the multi-function device 10 is in the FD-sleeping state 308a. Consequently, the SD-sleeping state 308b can be said to be power-saving compared to the FD-sleeping state 308a.

The multi-function device 10 has utility in the case below. For example, during business hours of a company having the multi-function device 10 it is desired that the multi-function device 10 executes the packet process in accordance with a received specific packet. In this case, in order to realize power-saving of the multi-function device 10, the multi-function device 10 is caused to transit to the FD-sleeping state 308a. Thereby, the power consumption of the multi-function device 10 can be reduced and, in the case where the specific packet is received, the multi-function device 10 can execute the packet process in accordance with the received specific packet.

On the other hand, outside of business hours of the company having the multi-function device 10, the multi-function device 10 need not execute the packet process in accordance with the specific packet. In this case, in order to realize power-saving of the multi-function device 10, the multi-function device 10 is caused to transit to the SD-sleeping state 308b. Thereby, the power consumption of the multi-function device 10 can be reduced. Further, since the multi-function device 10 does not execute the packet process despite having received the specific packet, the power-saving state can be maintained.

In the case where the temporal releasing time information is included in the transit instruction packet received from the PC 100 (YES in S28 of FIG. 4), the multi-function device 10 transits from the SD-sleeping state 308b to the L-sleeping state 306 at the time indicated by the temporal releasing time information. The multi-function device 10 sends the SD-sleeping release packet to the PC 100 (S115 of FIG. 7) at the timing of transiting to the L-sleeping state 306. According to this configuration, the PC 100 can send packets to the multi-function device 10 after the multi-function device 10 has been transited from the SD-sleeping state 308b. Consequently, the PC 100 can prevent the packets sent to the multi-function device 10 from being deleted by the multi-function device 10 (S100 of FIG. 6).

The multi-function device 10 does not change the FD-sleeping transit flag to "1" even if a releasing instruction packet is received from a device other than the PC 100 which had sent the transit instruction packet. According to this configuration, the device sending the transit instruction packet and the device sending the releasing instruction packet can be limited to the same device. Thereby, the state of the multi-function device 10 can be managed by only one device.

(Corresponding Relationships)

Moreover, the multi-function device 10 is an example of the "communication device". Further, the main CPU 20 and the sub CPU 30 are examples of the "processing unit", the main CPU 20 is an example of the "first processor" and the sub CPU 30 is an example of the "second processor". The SRAM 60 and the SDRAM 90 are examples of the "memory". The processing state 302, the standby state 304 and the L-sleeping state 306 are examples of the "high consumption state", the FD-sleeping state 308a is an example of the "first low consumption state", and the SD-sleeping state 308b is an example of the "second low consumption state". The PC 100 is an example of the "specific device".

The FD-sleeping transit condition is an example of the "first condition", and the FD-sleeping transit condition together with reception of the transit instruction packet is an example of the "second condition". S84 and S86 of FIG. 6 are examples of the "first transiting process" and the "second transiting process". The process S130 to S134 of FIG. 7 is an example of the "third transiting process". The process S124 of FIG. 7 is an example of the "fourth transiting process".

Specific examples of the present invention are described above in detail, but these examples are merely illustrative and place no limitation on the scope of the patent claims. The technology described in the patent claims also encompasses various changes and modifications to the specific examples described above.

(Variants)

(1) In the above embodiment, the multi-function device 10 comprises the two CPUs 20, 30. However, instead, the multi-function device 10 may comprise only the main CPU 20. In this case, the frequency of the clock signal supplied to the main CPU 20 may transit to a low state and a high state. In the state where the frequency of the clock signal is high, the power consumption of the main CPU 20 is relatively high, and in the state where the frequency of the clock signal is low, the power consumption of the main CPU 20 is relatively low. In the case where the multi-function device 10 is in the states 302 to 306, the frequency of the clock signal supplied to the main CPU 20 is the high state, and in the case where the multi-function device 10 is in the FD-sleeping state 308a or the SD-sleeping state 308b, the frequency of the clock signal supplied to the main CPU 20 may be the low state. In this case, instead of the sub CPU 30 in the above embodiment, the main CPU 20 may execute the processes performed by the sub CPU 30 (the processes of FIGS. 6, 7). In this variant, the main CPU 20 is an example of the "processing unit", the state where the frequency of the clock signal supplied to the main CPU 20 is high is an example of the "high consumption state", and the state where the frequency of the clock signal supplied to the main CPU 20 is low is an example of the "low consumption state".

(2) In the above embodiment, the multi-function device 10 comprises the two RAMs 60, 90. However, instead, the multi-function device 10 may comprise only one RAM. In this case, while the power supply of the multi-function device 10 is ON, the one RAM may usually be in the normal behavior mode. In this variant, the one RAM is an example of the "memory".

(3) In the above embodiment, in the FD-sleeping state 308a and the SD-sleeping state 308b, the main CPU 20 is in the sleeping state, and the SDRAM 90 is in the self refresh mode. However, in the PD-sleeping state 308a and the SD-sleeping state 308b, the main CPU 20 may be in the non-sleeping state. In this case, the "low consumption state" may be achieved by causing the SDRAM 90 to transit to the self refresh mode. Similarly, in the FD-sleeping state 308a and the SD-sleeping state 308b, the SDRAM 90 may be in the normal behavior mode. In this case, the "low consumption state" may be achieved by causing the main CPU 20 to transit to the sleeping state. Moreover, in both the above embodiment and the present variant, the states (sleeping state or non-sleeping state) of the CPUs 20, 30 (i.e., the "processing units") may be identical in the FD-sleeping state 308a and the SD-sleeping state 308b.

(4) In the above embodiment, as shown in FIG. 2, the multi-function device 10 can transit to the SD-sleeping state 308b when in either the L-sleeping state 306 or the FD-sleeping state 308a. Instead, the multi-function device 10 may be unable to transit to the SD-sleeping state 308b from the L-sleeping state 306. In this case, if an FD-sleeping state transiting condition is met (YES in S44 of FIG. 5), the CPUs 20, 30 may transit to the FD-sleeping state 308a regardless of whether the SD-sleeping state transit flag is "1". After the transition to the FD-sleeping state 308a, the sub CPU 30 may transit to the SD-sleeping state 308b in the case where the SD-sleeping state transit flag is "1". In this variant, the FD-sleeping state 308a is an example of the "specific state".

(5) In the above embodiment, when the temporal releasing time is reached (YES in S114 of FIG. 7), the sub CPU 30 sends the SD-sleeping release packet (S115 of FIG. 7) when transiting to the L-sleeping state 306. Instead, when sending the SD-sleeping transit packet (S54 of FIG. 5), the main CPU 20 may send a packet that includes the temporal releasing time information to the specific external device. In this variant, the process of sending the packet that includes the temporal releasing time information to the specific external device is an example of the "sending process".

(6) The user may perform an operation to store the process permission table 102 in advance in the flash memory 80, etc. of the multi-function device 10. Alternatively, the process permission table 102 may be generated by the multi-function device 10 or the PC 100. For example, while the main CPU 20 is in the non-sleeping state, the main CPU 20 may record, in the SDRAM 90, a combination of the MAC address of the sending source device of the packet received by the multi-function device 10 and the protocol of the packet. In a case with a predetermined number or more of the same combinations, from among the combinations recorded in the SDRAM 90, is being stored, the main CPU 20 may record the combinations in the process permission table 102 at the timing of transiting to the SD-sleeping state 308b.

(7) In the above embodiment, the process permission table 102 records the combinations 102a to 102e of the MAC address and the protocol of the packet. However, the combinations 102a to 102e may include user ID, IP address, etc. In this case, in the determining process (S96, S98 of FIG. 6), the determining unit 36 may determine whether to execute the packet process by determining whether the user ID of the user of the sending source device included in the packet received in S88 of FIG. 6 and the IP address of the sending source device are recorded in the process permission table 102. In the present variant, each of the user ID and the IP address is an example of the "sending source identification information".

(8) In the above embodiment, the units 22, 24 are realized by the main CPU 20 executing processes in accordance with a program. However, at least one of the units 22, 24 may be realized by hardware such as a logic circuit. Further, the units 34, 36, 38 are realized by the sub CPU 30 executing processes according to a program. However, at least one of the units 34, 36, 38 may be realized by hardware such as a logic circuit.

(9) The "communication device" need not be a multi-function device, but may be a communication device such as a PC, printer, server, PDA, etc.

Further, the technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A communication device to be connected with a network, the communication device comprising:
one or more processors; and
one or more memories, at least one of the one or more memories storing computer-readable instructions therein, the computer-readable instructions, when executed by the one or more processors, causing the communication device to execute:
a receiving process for receiving a packet via the network; and
a packet process in accordance with the packet received by the receiving process,
wherein the communication device is capable of transiting between a high consumption state in which a power consumption of at least one of the one or more processors and the one or more memories is relatively high and a low consumption state in which the power consumption of at least one of the one or more processors and the one or more memories is relatively low,
the low consumption state includes a first low consumption state and a second low consumption state,
in a case where a first condition is met while the communication device is in the high consumption state, the computer-readable instructions, when executed by the one or more processors, further causes the communication device to execute a first transiting process for causing the communication device to transit from the high consumption state to the first low consumption state,
in a case where a second condition different from the first condition is met while the communication device is in a specific state which is one state of the high consumption state and the first low consumption state, the computer-readable instructions, when executed by the one or more processors, further causes the communication device to execute a second transiting process for causing the communication device to transit from the specific state to the second low consumption state, the second condition including that the receiving process for receiving, from a specific device, a third packet including a first command instructing to transit a state of the communication device is executed,
the packet process is executed in accordance with a first packet in a case where the receiving process for receiving the first packet is executed after the communication device had transited to the first low consumption state by the first transiting process, and
the packet process is not executed in accordance with the first packet in a case where the receiving process for receiving the first packet is executed after the communication device had transited to the second low consumption state by the second transiting process.

2. The communication device as in claim 1, wherein
in a case where the receiving process for receiving a second packet different from the first packet is executed while the communication device is in the second low consumption state, the computer-readable instructions, when executed by the one or more processors, further causes the communication device to execute a determining process for determining, using at least one of a protocol and sending source identification information of the second packet, whether or not the packet process in accordance with the second packet should be executed, and the packet process is executed in accordance with the second packet in a case where it is determined that the packet process in accordance with the second packet should be executed.

3. The communication device as in claim 1, wherein the one or more processors comprises a first processor and a second processor, the first processor is configured to transit between a non-sleeping state and a sleeping state, in a case where the communication device is in the high consumption state, the first processor is in the non-sleeping state and is capable of causing the communication device to execute the packet process, in a case where the communication device is in the low consumption state, the first processor is in the sleeping state and is not capable of causing the communication device to execute the packet process, the second processor is configured to be capable of causing the communication device to execute, on behalf of the first processor, the packet process in accordance with a packet received while the first processor is in the sleeping state, and the computer-readable instructions, when executed by the second processor, causes the communication device to execute the first transiting process and the second transiting process.

4. The communication device as in claim 1, wherein the computer-readable instructions, when executed by the one or more processors, further causes the communication device to execute a fourth transiting process for causing the communication device to transit from the second low consumption state to one state of the high consumption state and the first low consumption state when a predetermined condition is met while the communication device is in the second low consumption state, and the predetermined condition includes that the receiving process for receiving, from the specific device, a fourth packet including a second command different from the first command is executed while the communication device is in the second low consumption state, the second command instructing to transit a state of the communication device.

5. The communication device as in claim 1, wherein the computer-readable instructions, when executed by the one or more processors, further causes the communication device to execute a fourth transiting process for causing the communication device to transit from the second low consumption state to one state of the high consumption state and the first low consumption state when a predetermined condition is met while the communication device is in the second low consumption state, and the predetermined condition includes that a second timing indicated by second timing information included in the third packet is reached.

6. A communication device to be connected with a network, the communication device comprising:

one or more processors; and one or more memories, at least one of the one or more memories storing computer-readable instructions therein, the computer-readable instructions, when executed by the one or more processors, causing the communication device to execute:

a receiving process for receiving a packet via the network; and a packet process in accordance with the packet received by the receiving process, wherein the communication device is capable of transiting between a high consumption state in which a power consumption of at least one of the one or more processors and the one or more memories is relatively high and a low consumption state in which the power consumption of at least one of the one or more processors and the one or more memories is relatively low, the low consumption state includes a first low consumption state and a second low consumption state, in a case where a first condition is met while the communication device is in the high consumption state, the computer-readable instructions, when executed by the one or more processors, further causes the communication device to execute a first transiting process for causing the communication device to transit from the high consumption state to the first low consumption state, in a case where a second condition different from the first condition is met while the communication device is in a specific state which is one state of the high consumption state and the first low consumption state, the computer-readable instructions, when executed by the one or more processors, further causes the communication device to execute a second transiting process for causing the communication device to transit from the specific state to the second low consumption state, the packet process is executed in accordance with a first packet in a case where the receiving process for receiving the first packet is executed after the communication device had transited to the first low consumption state by the first transiting process, the packet process is not executed in accordance with the first packet in a case where the receiving process for receiving the first packet is executed after the communication device had transited to the second low consumption state by the second transiting process, in a first timing while the communication device is in the second low consumption state, the computer-readable instructions, when executed by the one or more processors, further causes the communication device to execute a third transiting process for causing the communication device to transit from the second low consumption state to one state of the high consumption state and the first low consumption state only during a specific time period, and the computer-readable instructions, when executed by the one or more processors, further causes the communication device to execute a sending process for sending first timing information indicating the first timing to outside via the network in a case where the third transiting process is executed.

7. A communication device to be connected with a network, the communication device comprising:

one or more processors; and one or more memories, at least one of the one or more memories storing computer-readable instructions therein, the computer-readable instructions, when executed by the one or more processors, causing the communication device to execute:

a receiving process for receiving a packet via the network; and a packet process in accordance with the packet received by the receiving process, wherein the communication device is capable of transiting between a high consumption state in which a power consumption of at least one of the one or more processors and the one or more memories is relatively high and a low consumption state in which the power consumption of at least one of the one or more processors and the one or more memories is relatively low, the low consumption state includes a first low consumption state and a second low consumption state, in a case where a first condition is met while the communication device is in the high consumption state, the computer-readable instructions, when executed by the one or more processors, further causes the communication device to execute a first transiting process for causing the communication device to transit from the high consumption state to the first low consumption state, in a case where a second condition different from the first condition is met while the communication device is in a specific state which is one state of the high consumption state and the first low consumption state, the computer-readable instructions, when executed by the one or more processors, further causes the communication device to execute a second transiting process for causing the communication device to transit from the specific state to the second low consumption state, in a case where both the first condition and the second condition are met while the communication device is in the high consumption state, the second transiting process is executed without the first transiting process, the packet process is executed in accordance with a first packet in a case where the receiving process for receiving the first packet is executed after the communication device had transited to the first low consumption state by the first transiting process, and the packet process is not executed in accordance with the first packet in a case where the receiving process for receiving the first packet is executed after the communication device had transited to the second low consumption state by the second transiting process.

* * * * *